US007469909B2

(12) United States Patent
Strauch et al.

(10) Patent No.: US 7,469,909 B2
(45) Date of Patent: Dec. 30, 2008

(54) CHUCK FOR RECEIVING TOOLS OPERATED BY ROTATING AROUND THE AXIS THEREOF

(75) Inventors: Martin Strauch, Wuppertal (DE); Michael Abel, Radevormwald (DE); André Müller, Wuppertal (DE)

(73) Assignee: Wera Werk Hermann Werner GmbH & Co. KG, Wuppertal (DE)

( * ) Notice: Subject to any disclaimer, the term of this patent is extended or adjusted under 35 U.S.C. 154(b) by 440 days.

(21) Appl. No.: 10/515,212

(22) PCT Filed: May 12, 2003

(86) PCT No.: PCT/EP03/04920

§ 371 (c)(1), (2), (4) Date: Jul. 19, 2005

(87) PCT Pub. No.: WO03/103901

PCT Pub. Date: Dec. 18, 2003

(65) Prior Publication Data

US 2006/0097464 A1 May 11, 2006

(30) Foreign Application Priority Data

Jun. 10, 2002 (DE) ................................ 102 25 505
Nov. 21, 2002 (DE) ................................ 102 54 339

(51) Int. Cl.
*B23B 31/22* (2006.01)

(52) U.S. Cl. .......................... 279/75; 279/143; 279/905

(58) Field of Classification Search ................... 279/66, 279/74, 75, 76, 78, 80, 137, 143, 155, 902, 279/905; 81/438, 439
See application file for complete search history.

(56) References Cited

U.S. PATENT DOCUMENTS 4,188,041 A * 2/1980 Soderberg .................... 279/75
5,398,946 A 3/1995 Quiring
6,199,872 B1 3/2001 Hasan
6,270,085 B1 * 8/2001 Chen et al. .................... 279/22

(Continued)

FOREIGN PATENT DOCUMENTS

DE 29 34 428 3/1981

(Continued)

*Primary Examiner*—David P Bryant
*Assistant Examiner*—Eric A Gates
(74) *Attorney, Agent, or Firm*—Lucas & Mercanti, LLP

(57) ABSTRACT

A chuck for receiving tools (1) that are operated by rotating around the axis thereof, particularly screwdriver bits, and having an insertion section (3) which is provided with a receiving cavity (2) having a non-circular cross-sectional area (3). The tool can be locked in the cavity (2) by a holding element (4) which is assigned to the cavity wall in order to prevent the tool from being withdrawn from the cavity (2). The holding element (4) can be deactivated by displacing an actuating member in a form of an actuating sleeve (5). The tool (1) rests backwards against the cavity (2). The tool (1) can be displaced from the resting position in the direction of the opening of the cavity (2) by actuating the actuating sleeve (5). In order to facilitate removal of the bit, the chuck also comprises components (15, 16, 17) for releasing the face (1) of the bit, and a magnet (9) which retains the bit in the cavity from the resting position.

9 Claims, 11 Drawing Sheets

U.S. PATENT DOCUMENTS

| | | | | |
|---|---|---|---|---|
| 6,311,989 | B1 * | 11/2001 | Rosanwo | 279/75 |
| 6,345,560 | B1 * | 2/2002 | Strauch et al. | 81/477 |
| 6,457,916 | B2 * | 10/2002 | Wienhold | 408/240 |
| 6,637,755 | B2 * | 10/2003 | Chen et al. | 279/22 |
| 6,644,150 | B2 * | 11/2003 | Chen | 81/438 |
| 6,695,321 | B2 * | 2/2004 | Bedi et al. | 279/22 |
| 6,931,967 | B1 * | 8/2005 | Chang | 81/451 |
| 7,063,332 | B2 * | 6/2006 | Muller | 279/75 |
| 7,111,530 | B2 * | 9/2006 | Huang | 81/438 |
| 7,261,023 | B2 * | 8/2007 | Taguchi | 81/451 |
| 2001/0043841 | A1 | 11/2001 | Wienhold | |
| 2004/0081523 | A1 * | 4/2004 | Vasudeva et al. | 408/240 |
| 2006/0181033 | A1 * | 8/2006 | Chen | 279/75 |

FOREIGN PATENT DOCUMENTS

| | | |
|---|---|---|
| DE | 42 07 337 | 6/1993 |
| DE | 199 23 006 | 6/2000 |
| DE | 199 32 369 | 1/2001 |
| DE | 101 41 668 | 3/2003 |
| DE | 10219418 A1 * | 11/2003 |
| EP | 0 685 300 | 12/1995 |
| EP | 1 122 032 | 8/2001 |
| WO | WO 00/66329 | 11/2000 |
| WO | WO 01/96052 | 12/2001 |

* cited by examiner

CHUCK FOR RECEIVING TOOLS OPERATED BY ROTATING AROUND THE AXIS THEREOF

FIELD AND BACKGROUND OF THE INVENTION

The invention relates to a chuck for receiving tools which can be used by rotation about their axis, in particular screwdriver inserts, having an insertion portion having a receiving cavity which has a cross-sectional area that is not round, in which receiving cavity the tool can be secured by means of a holding element associated with the wall of the cavity against being pulled out of the receiving cavity, which holding element can be deactivated by a sliding movement of an actuating member, in particular in the form of an actuating sleeve, the tool being supported at the rear in the receiving cavity.

Chucks of this type are described by DE 29 34 428 and DE 199 32 369. In those documents, the polygonal portion of a bit is fitted into a polygonal bore in an insertion portion. A holding element which is formed by a ball acts on the outer surface of the bit, in particular on its edge or edge cutout. The ball is pressed radially inward onto a polygonal flank or into the corner cutout by an inclined flank of an actuating sleeve. The force required is supplied by a compression spring which spring loads the actuating sleeve and counter to the spring force of which the sleeve is displaced in the release direction.

A magnet which forms the base of the receiving cavity is provided to augment the holding force. In particular short and thin bits can only be removed from the chuck with difficulty counter to the force of the magnet.

SUMMARY OF THE INVENTION

Therefore, the invention is based on the object of further developing a chuck of the generic type in a manner that is advantageous for use, and in particular of facilitating removal of the bit.

The object is achieved by the invention given in the claims.

Claim 1 provides firstly and substantially that the tool is displaceable out of the supported position toward the opening of the receiving cavity by actuation of the actuating sleeve. According to an advantageous refinement of the invention, this is achieved by an auxiliary tool removal member that is displaceable by and along with the actuating sleeve. This auxiliary tool removal member may be a pusher associated with the base of the receiving cavity. This pusher can be dragged along by the actuating sleeve. This dragging-along movement preferably takes place in the same direction as the displacement of the actuating sleeve. It is preferable for the pusher to engage on the rear end face of the tool in order to displace it in part out of the receiving cavity, so that the length of the portion of the tool projecting out of the receiving cavity on which it is possible to grip is increased. Moreover, if the tool bears against a magnet forming the base of the receiving cavity, the end face of the tool is spaced apart from the magnet as a result of the pusher displacement. A gap is formed. The holding force exerted on the tool by the magnet is reduced as a result of this gap. The holding element is preferably a pressure piece which acts on the clamp-in shank of the tool in the radial direction. This pressure piece may be formed as a ball. In particular, the pressure piece is formed and mounted in the same way as described in DE 101 41 668.7. The actuating sleeve is displaceable counter to the force of a spring. In a preferred configuration, the pusher may be formed by a portion of a spring of this type. However, there is also provision for the pusher to be acted on only by a portion of the actuating sleeve spring. A rear end portion of the actuating sleeve spring can engage through a slot. In a preferred configuration, the pusher is formed by an angled-off end portion of a compression coil spring that is seated on the insertion portion. This compression coil spring may at one end be supported on a support ring which is seated in an axially fixed position in a circumferential groove in the insertion portion. The other end of the compression coil spring is supported on a stop shoulder that is formed by a drawn-in collar of the actuating sleeve. This end of the compression coil spring has a radially inwardly directed portion. This portion projects through the slot in the insertion portion and into the receiving cavity. An angled portion of the end of the compression coil spring can then be displaced along the wall of the cavity when the actuating sleeve is displaced. The pusher or the spring end has a certain freedom of movement with respect to the end face or with respect to an inclined end edge of the bit, so that first of all the clamping surface of the actuating sleeve is displaced in order to allow the pressure piece to move aside. Only when this retention of the tool has been released does the pusher or the end of the spring come to bear against the bit in order to displace it in the outward direction within the receiving cavity.

A further aspect of the same invention provides for the end face of the bit to bear against a magnet. To achieve the object set at the outset, it is proposed to provide means which can be used to separate the end face of the bit from the magnet. These means enable the end face of the bit to be brought out of bearing contact with the magnet. This can be effected by means of the measures described above. However, it is also provided that the magnet is spaced apart from the bit, i.e. the bit retains its insertion position within the insertion cavity. As a result of the magnet being spaced apart from the end face of the bit, the holding force exerted on the bit by the magnet is considerably reduced, so that even small and in particular short bits can be removed from the chuck without problems. It is preferable for an annular region of the end face of the bit, which is formed in particular as a bevel, to be supported on a radial projection. This radial projection may surround a cavity in which the magnet is located. The magnet may be fixedly connected to a portion of the clamp-in portion. This clamp-in portion has a polygonal cross-sectional shape. This clamp-in portion may be disposed in a rotationally fixed but axially slidable manner within the insertion portion of the chuck, where it is mounted in an axially slidable manner. The clamp-in portion may be axially displaceable between two stops, one stop corresponding to the axial position of the clamp-in portion in which the magnet bears in surface contact against the end face of the bit. The other stop may be associated with the spaced-apart position of the magnet from the end face of the bit.

This chuck functions in the following way: if the clamp-in portion is retained in the chuck of an electric screwdriver, the chuck can be moved into a position of readiness for receiving as a result of sliding movement of the actuating sleeve. However, this is not necessary in the preferred configuration of the chuck, since the ball can move aside backward when it comes into contact with the rear bevel of the bit. If the bit is fitted into the receiving cavity, it bears areally against the base of the cavity, which is formed by the axially displaceable magnet. It is held by the magnet. However, the bit is also held by the ball. If the bit is to be removed from the chuck, the actuating sleeve is displaced away from the clamp-in portion, i.e. toward the opening of the receiving cavity. In conjunction with this displacement, a pulling force is exerted on the clamp-in portion that has been fitted into the chuck of the electric screwdriver. As an associated effect, the magnet which is fixedly connected to the clamp-in portion is displaced rearward, so that the holding force exerted on the bit by the magnet is considerably reduced. In this functional position of the actuating sleeve, the ball can move aside radially, so that the bit can be removed.

A further aspect of the invention likewise deals with the problem of simplifying the removal of a bit from a chuck of the generic type. For this purpose, it is proposed that the actuating member can be locked in its position in which it holds the holding element deactivated as a result of a sliding movement of a clamp-in portion with respect to the sleeve portion into which the clamp-in portion fits. As a result of this configuration, the holding element is moved out of its active position, so that the bit can be pulled out without its being necessary for the actuating member to be retained in its release position. This function is particularly advantageous if that end of the clamp-in portion which is located in the sleeve portion bears a magnet which, in the clamping position, bears against the end face of the bit. Displacing the clamp-in portion in part out of the sleeve causes the magnet to be separated from the bit. The end edge of the bit is supported against a circlip that is located in a circumferential groove in the sleeve portion. The axial displaceability of the clamp-in portion is stop-limited. This is achieved by means of a split washer which is located in a circumferential groove in the sleeve portion. It forms a radial projection which is located in a circumferential groove in the clamp-in portion. The axial width of the circumferential groove in the clamp-in portion determines the displacement travel of the latter. The actuating member is preferably locked in place by at least one blocking member which is located in a wall cutout in the sleeve portion and moves into a blocking recess in the actuating member. The blocking body may be a ball and the blocking recess may be formed by an annular groove. The diameter of the blocking body is greater than the wall thickness of the sleeve portion. The result of this is that the blocking body either projects beyond the outer wall of the sleeve portion or projects into the sleeve cavity. If the blocking body projects beyond the outer wall of the sleeve, it can enter into the blocking recess in the actuating member in order to hold it in the release position. The blocking body in this case bears on a lateral surface portion of the clamp-in portion and is supported at the rear by the latter. With the clamp-in portion slid inward, the blocking body can move into a moving-aside niche in the clamp-in portion. The clamp-in portion is retained against axial movement in this position by the actuating member, which is held in the locking position by a spring. In this position, which corresponds to the clamping position of the actuating member, the blocking body is prevented by the cylindrical inner cavity wall of the actuating member from being displaced in the radially outward direction. It is preferable for the sleeve which forms the actuating member to be displaced from the locking position into the release position in the removal direction of the bit. This takes place counter to the force of a spring which is supported against the sleeve portion. When the actuating sleeve has been displaced into the release position, the ball which forms the blocking body can enter into the annular cutout, which forms the blocking recess, in the actuating sleeve. The ball then emerges from the moving-aside niche in the clamp-in portion, so that the clamp-in portion can be displaced. During this displacement, a lateral surface portion of the clamp-in portion slides under the wall cutout in which the ball is located, so that radial displacement of the ball is not possible. The ball in this case blocks the actuating sleeve from being displaced rearward. As a result, the bit can easily be removed from the receiving cavity. If the bit is fitted into the receiving cavity again, its bevel on the end face acts on the abovementioned radial projection of the sleeve portion. This is associated with the sleeve portion being slid with respect to the clamp-in portion until the blocking ball can move into its associated moving-aside niche. The actuating sleeve is then displaced as a result of the force of the prestressed spring into its blocking position.

BRIEF DESCRIPTION OF THE DRAWINGS

Exemplary embodiments of the invention are explained below with reference to appended figures, in which:

FIG. 14 shows an illustration corresponding to FIG. 10 with the bit slid in.

DETAILED DESCRIPTION OF THE PREFFERRED EMBODIMENT(S)

Figure 1:
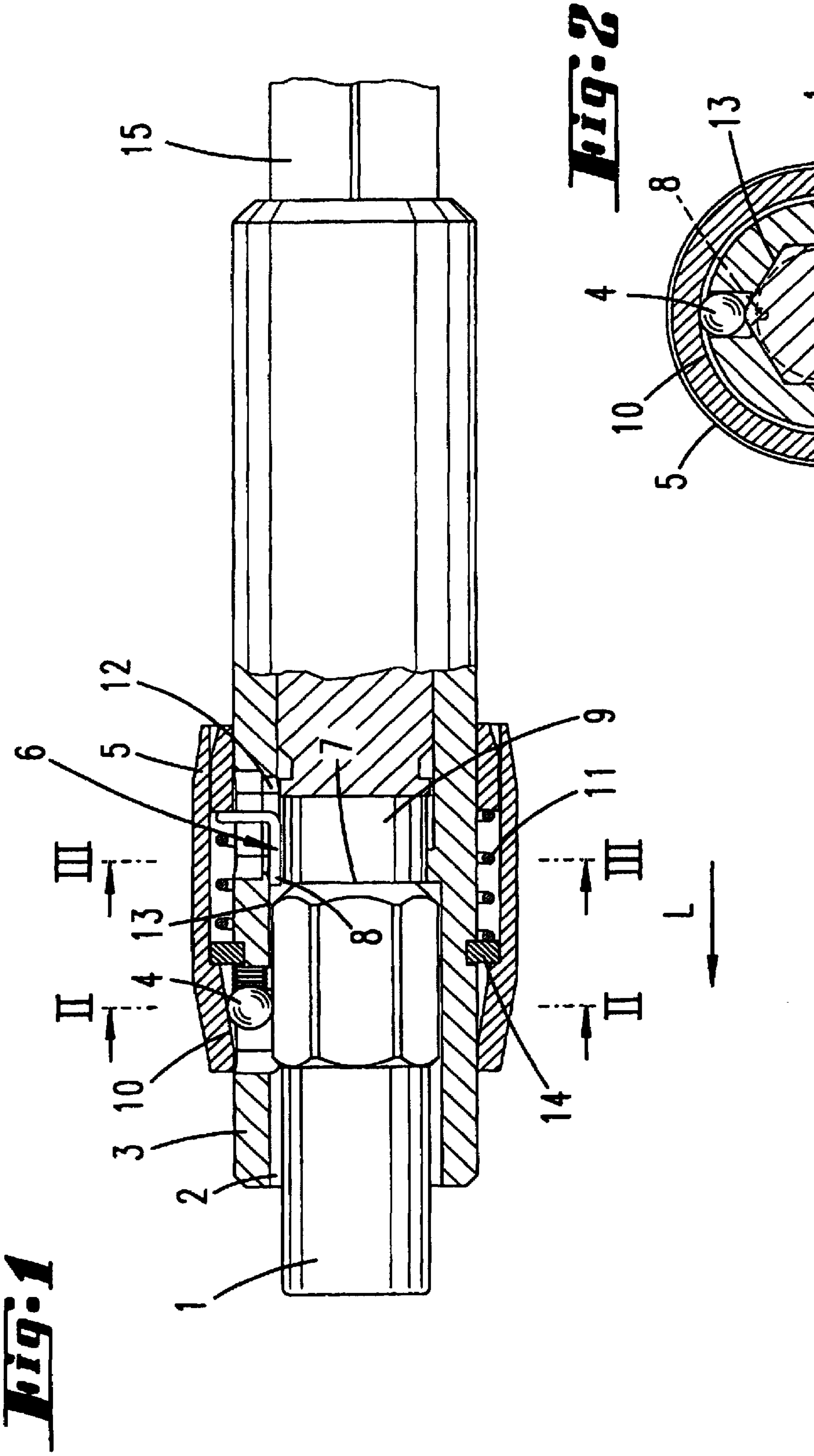
FIG. 1 shows the exemplary embodiment partially in longitudinal section, the tip of the bit and a partial region of the clamp-in portion of the chuck being broken away.

The chuck has an insertion portion 3 and a hexagonal clamp-in portion 15. This insertion portion 3 may consist of metal and at one end has a receiving cavity 2 for a screwdriver insert 1, in the form of a bit. At the other end, a clamp-in shank 15, the hexagon portion of which can be fitted into a chuck of an electric screwdriver, projects out of the insertion portion. With regard to the configuration of this clamp-in shank, reference is made to the prior art cited in the introduction. The clamp-in portion 15 can be pressed into a cavity in the insertion portion 3.

Figure 2:
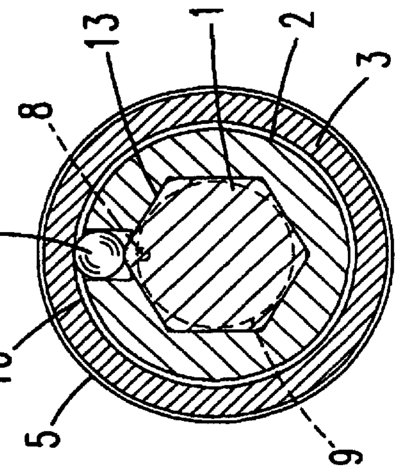
FIG. 2 shows a section on line II-II in FIG. 1.
Figure 4:
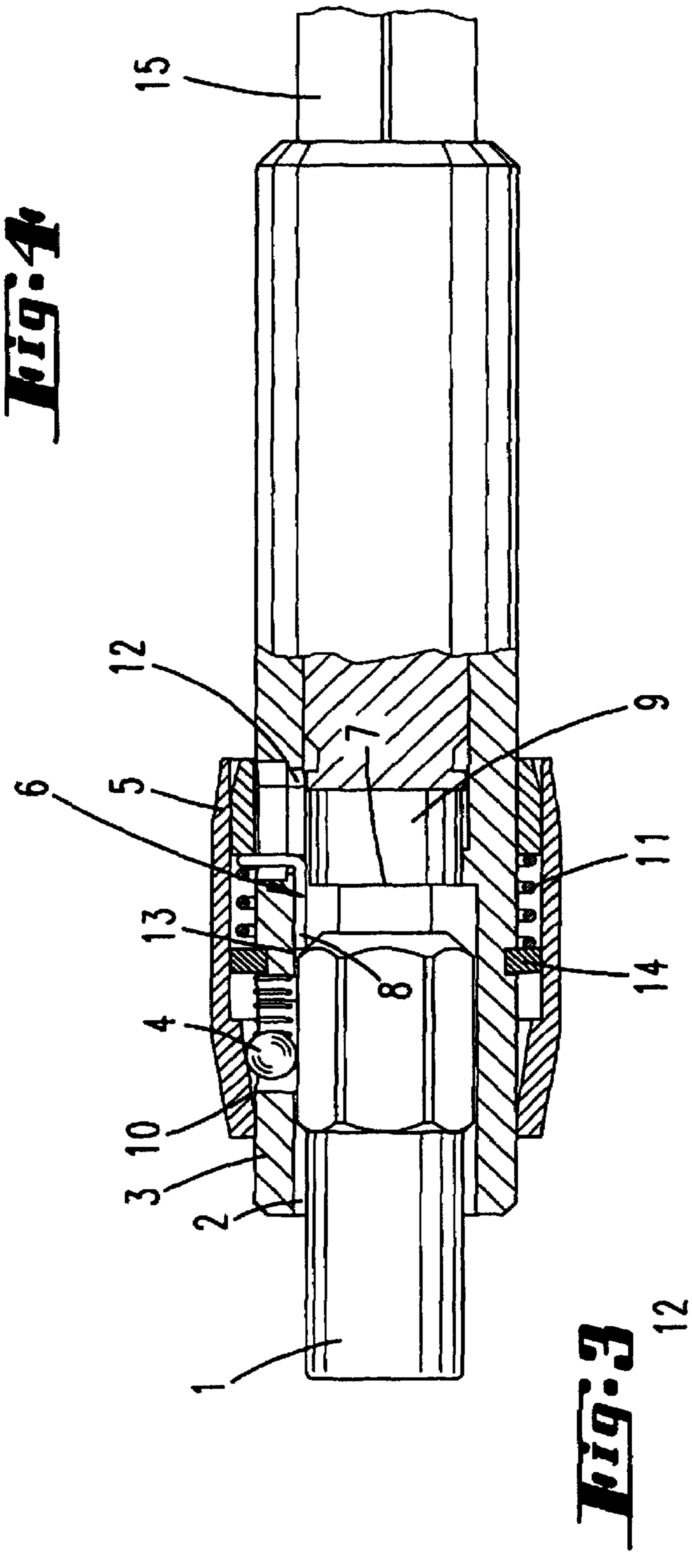
FIG. 4 shows an illustration corresponding to FIG. 1 with the actuating sleeve actuated.
Figure 3:
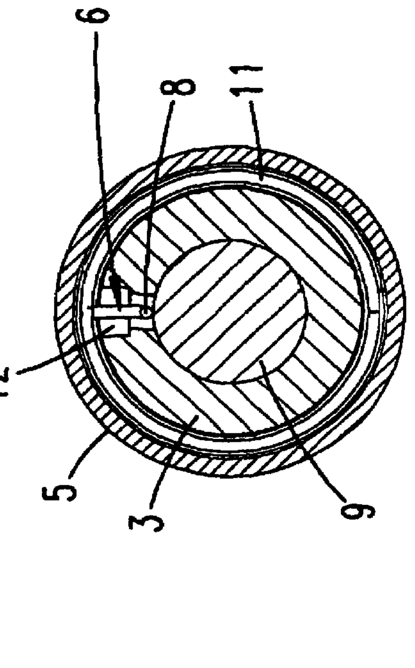
FIG. 3 shows a section on line III-III in FIG. 1.

As can be seen from FIG. 2, the receiving cavity 2 has a hexagonal cross section. A window is located in the region of an edge of the receiving cavity 2. In this aperture formed by the window there is located a ball 4 which forms the holding element and the diameter of which is greater than the wall thickness, so that the ball 4 can extend into the receiving cavity 2, in order there to hold the bit by being supported on the corner points of a corner cutout of the polygonal shank of the bit. On the outer side of the cavity, the ball 4 is acted on by an inclined clamping flank 10 of an actuating sleeve 5. The actuating sleeve 5 is displaceable, counter to the restoring force of a compression coil spring 11, from the clamping position illustrated in FIG. 1 into the release position illustrated in FIG. 3, with the compression coil spring 11 being stressed in the process. The compression coil spring 11 is supported for this on an annular support shoulder located in a groove in the insertion portion 3. This support shoulder is formed by a ring 14 against which the actuating sleeve 5 is also supported in the clamping position.

The rear end of the spring has an extension 6 which protrudes into a slot 12 in the insertion portion 3. This extension 6 projects into the receiving cavity 2 in the region of a corner of the receiving cavity 2, and together with an angled-off portion forms a pusher 8 which, in the clamping position illustrated in FIG. 1, projects only slightly beyond the base 7 of the receiving cavity 2. However, it is also provided that the pusher, which is formed by the spring end portion, does not project beyond the base 7 in the clamping position.

The base 7 of the receiving cavity 2 is formed by a cylindrical magnet 9. A free pocket is formed between the outer wall of the magnet 9 and the polygon corner of the receiving cavity 2. The spring end portion 6 is guided in this free pocket.

In variants of the invention that are not illustrated, the pusher may also be formed by a separate component. It is also provided that the pusher engages on the rear end face of the bit approximately in the center of the receiving cavity 2. The pusher can also be displaced in the opposite direction to the actuating sleeve 5. This can be realized, for example, by means of a reversing lever mechanism, if the actuating pusher has to be displaced toward the clamp-in portion 15 in order to release the holding element 4.

The device functions in the following way: starting from the clamping position illustrated in FIG. 1, in which the ball 4 is located in front of a shoulder of the bit 1 and therefore the bit cannot be pulled out of the receiving cavity 2, the actuating sleeve 5 is displaced in the direction indicated by arrow L, with the spring 11 being stressed. During this sliding displacement of the actuating sleeve 5, the ball 4 acquires space to move aside radially outward, so that the holding action of the ball 4 is eliminated. In principle, the bit could be pulled out of the receiving cavity 2 after this initial displacement of the actuating sleeve 5.

Further displacement of the actuating sleeve 5 in the direction L leads to the end of the pusher 8 which is formed by the spring end portion acting on the end face of the bit 1. In conjunction with this action, the bit 1 is also dragged in the direction of the actuating displacement L of the actuating sleeve 5. The end of the bit 1 becomes detached from the base 7 of the receiving cavity 2. A gap is formed between magnet 9 and bit 1. The bit 1 is displaced into the position illustrated in FIG. 3 or—in a variant of the invention which is not illustrated—completely out of the receiving cavity 2.

Unlike in the case of the clamping chuck that is known from DE 199 23 006, the outward displacement of the bit 1 is associated with a displacement of the actuating sleeve 5. In the subject matter of the invention, there is no need for an ejector spring which acts permanently against the end face of the bit 1.

Figure 5:
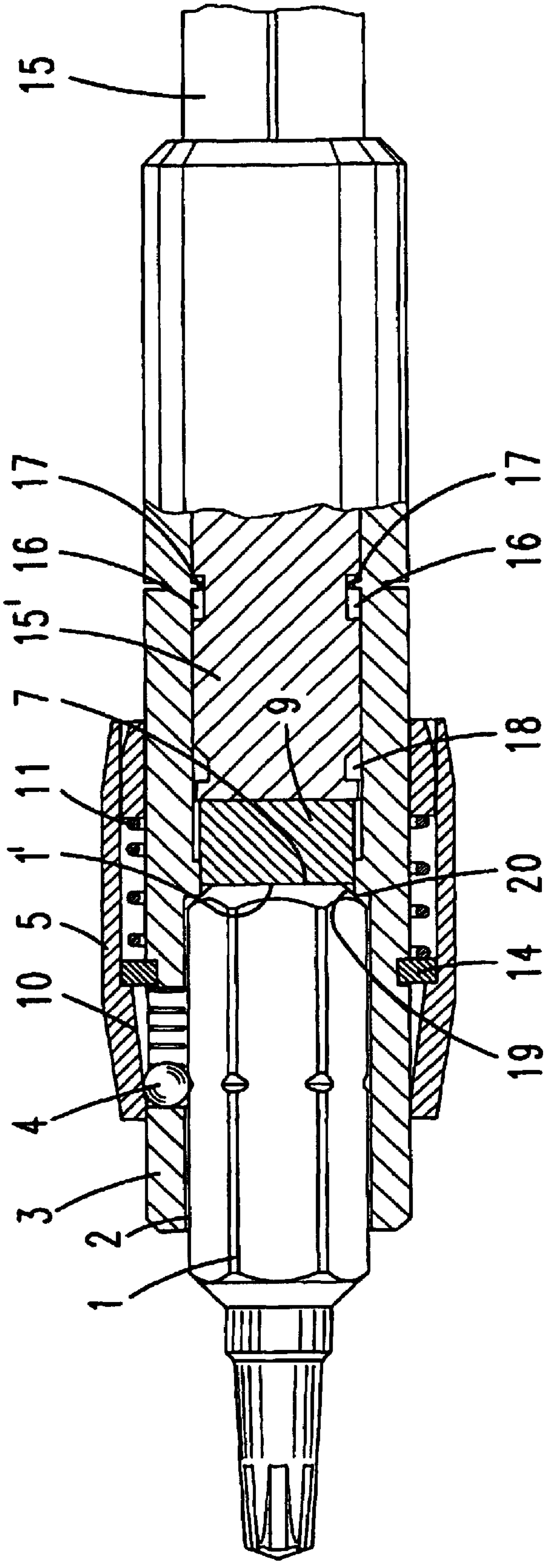
FIG. 5 shows an illustration of a second exemplary embodiment of the invention corresponding to FIG. 1 of the first exemplary embodiment.
Figure 6:
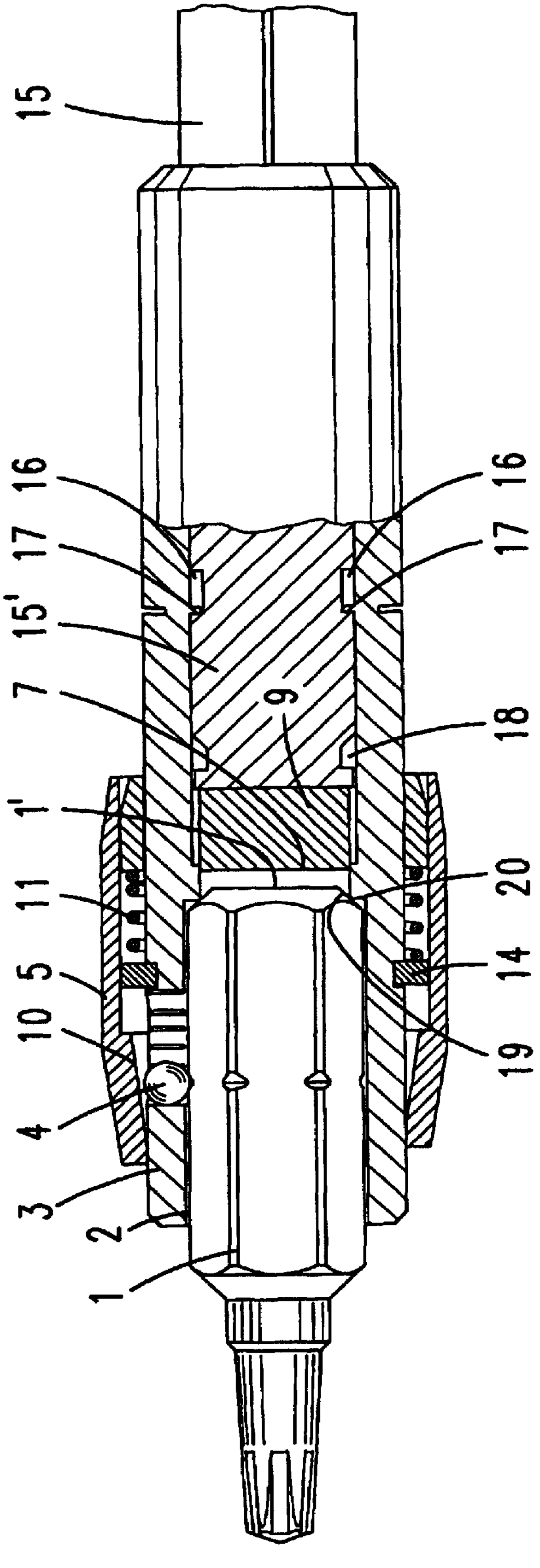
FIG. 6 shows the second exemplary embodiment illustrated in FIG. 5 with the magnet displaced rearward.

In the exemplary embodiment illustrated in FIGS. 5 and 6, identical elements of the chuck bear the same reference numerals as in the first exemplary embodiment.

A bit 1 is fitted into a receiving cavity 2 in an insertion portion 3, which overall is formed as a polygonal sleeve. A ball 4, which is acted on by a spring in the direction of the opening of the receiving cavity 2, fits into a slot in the wall. The ball is acted on in the radially inward direction by means of a clamping flank 10 of an actuating sleeve 5. The portion 15' of a clamp-in portion 15 fits into the rear part of the insertion portion 3. The clamp-in portion 15 is formed as a hexagon and is intended to be able to be fitted by means of its free end into the chuck of an electric screwdriver. The portion 15'of the clamp-in portion 15 fits in the insertion portion 3 in a rotationally fixed but axially slidable manner. In front of the head of the portion 15 there is a magnet 9. The magnet 9 is fixedly connected to the portion 15. The axial displaceability of the clamp-in portion 15 is stop-limited. This is achieved by means of a projection 17 which can be stamped or rolled in after assembly of the clamp-in portion 15. This projection 17 engages in a circumferential cutout 16 in the portion 15'.

An annular bevel 19 which surrounds the annular surface 1' of the bit is supported on a radial projection 20. This radial projection 20 leaves a central opening in which the magnet 9 is located. In the position of use illustrated in FIG. 5, the surface 7 of the magnet 9 bears areally against the end face 1'. If an axial force is exerted on the clamp-in portion 15, this force is transmitted via the magnet 9 directly into the end face 1' of the bit 1. On the other hand, if a pull which is greater than the holding force of the magnet 9 on the end face 1' of the bit 1 is exerted on the clamp-in portion 15, the magnet 9 is removed from the end face 1' of the bit 1. The result of the magnet 9 being removed from the bit 1 is that the holding force exerted by the magnet 9 on the bit 1 is considerably reduced, so that the bit can be pulled out of the receiving cavity 2 when the actuating sleeve has been moved into the release position (cf. FIG. 6).

The pulling force can be applied by the actuating sleeve 5 being displaced toward the opening of the receiving cavity 2 when a clamp-in portion 15 has been clamped in a chuck of an electric screwdriver or the like. At the same time as this displacement, the ball 4 is released in order to enable it to move aside outward in the radial direction.

Figure 7:
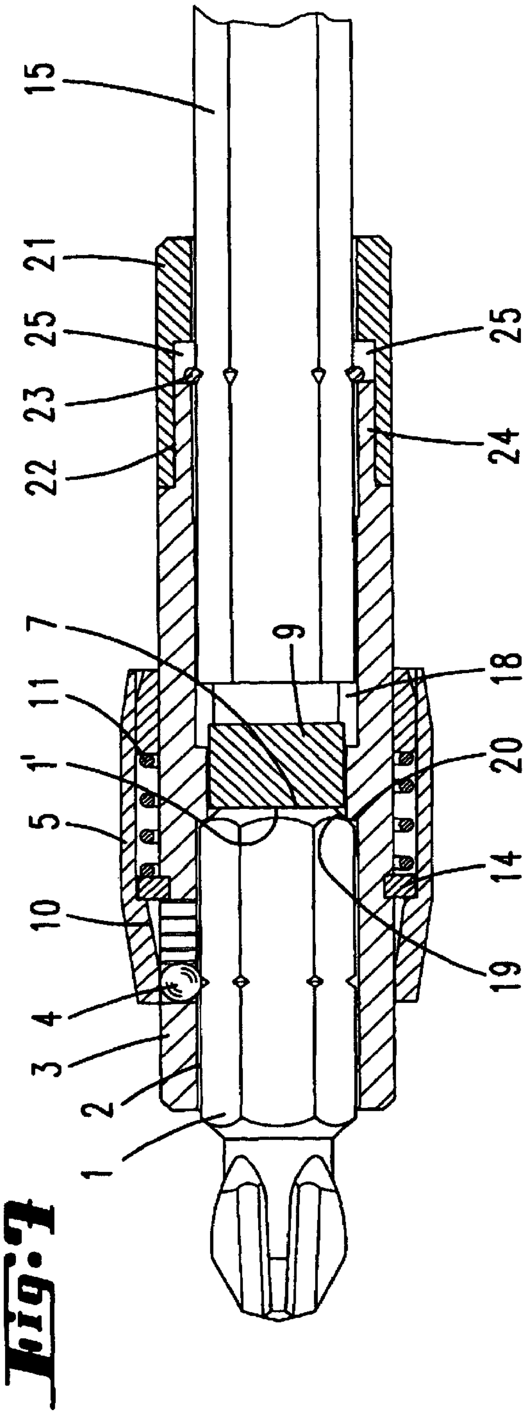
FIG. 7 shows a further exemplary embodiment corresponding to FIG. 5.
Figure 8:
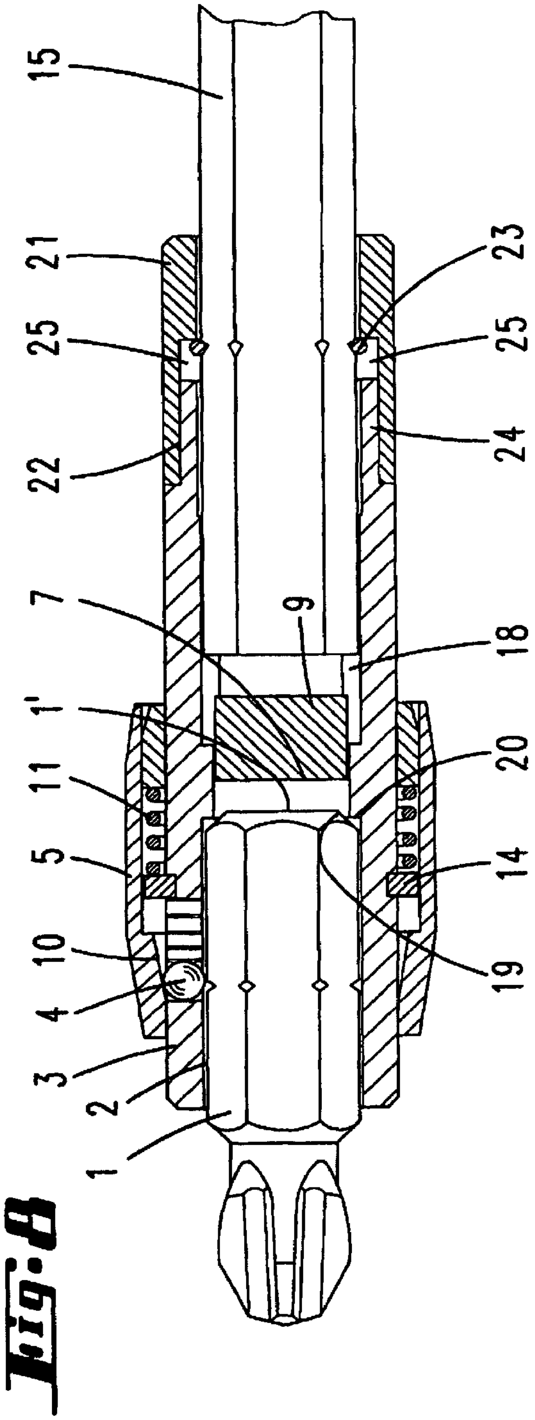
FIG. 8 shows the further exemplary embodiment on the basis of an illustration corresponding to FIG. 6.
Figure 9:
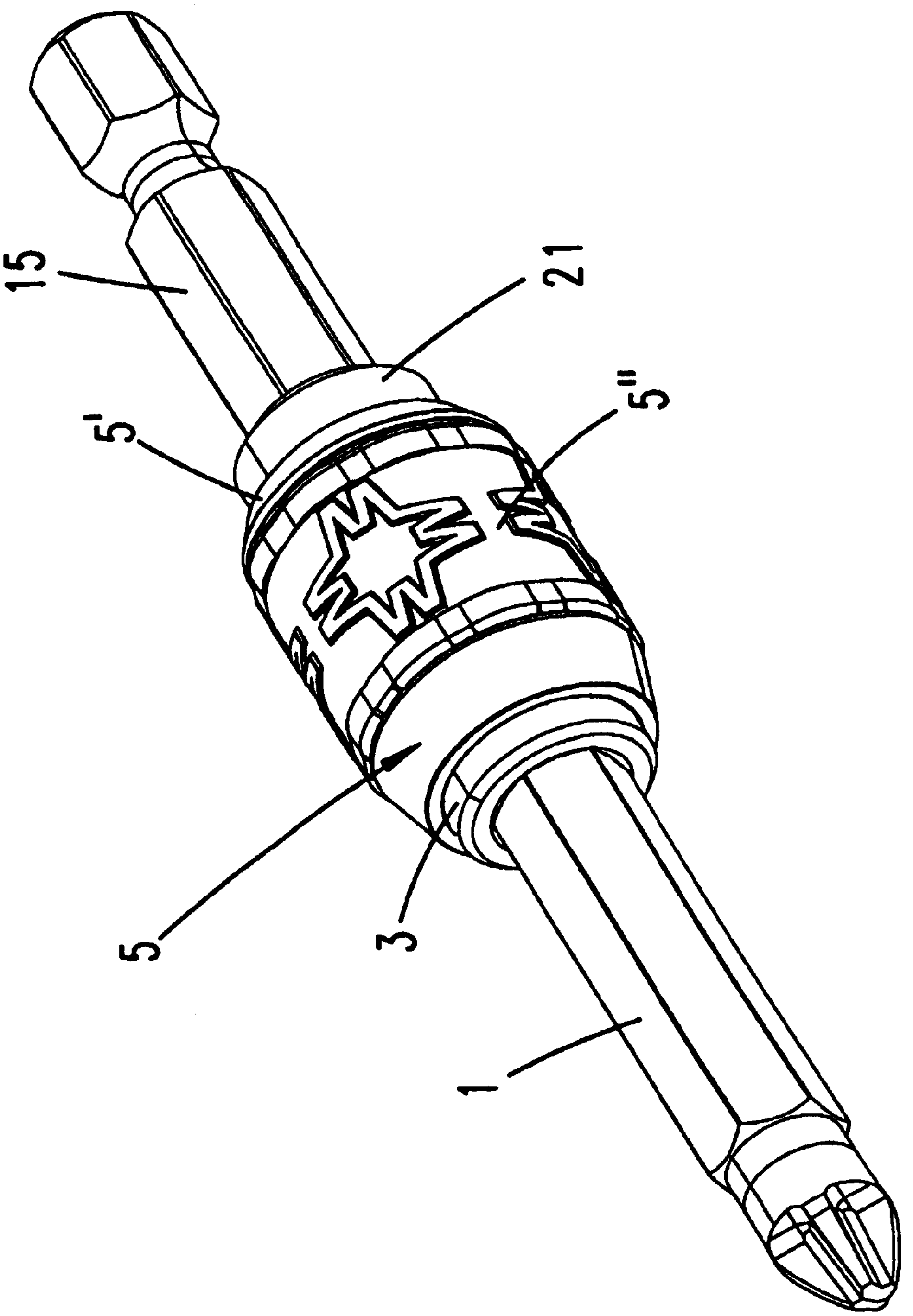
FIG. 9 shows a further exemplary embodiment of the invention in perspective illustration.

In terms of its functioning, the exemplary embodiment illustrated in FIGS. 7 and 8 substantially corresponds to the exemplary embodiment of FIGS. 5 and 6. The pertinent factor in this embodiment is the stop-limited holding of the clamp-in portion 15 in the polygonal cavity in the insertion portion 3. The hexagonal clamp-in portion 15 has corner cutouts in which a split washer 23 surrounding the clamp-in portion 15 is located. This split washer is located in an annular cutout 25 in the insertion portion 3. The annular cutout 25 in the insertion portion 3 is formed by a sleeve portion fitted onto the end of the insertion portion 3. For this purpose, the end portion of the insertion portion 3 forms an annular step portion 24. A wall portion 22 of widened diameter of the sleeve end portion 21 has been fitted onto this annular step portion 24, where it is held tightly in place.

In the exemplary embodiment illustrated in FIGS. 9 to 14, the actuating sleeve 5 is formed in two parts. An inner portion 5', which slides directly along the sleeve portion 21, has a circumferential groove that is wide in the axial direction. A second sleeve portion 5" made from plastic is located rotatably in this circumferential groove. The chuck can also be held on this second sleeve portion 5" during rotary operation. The sleeve 5" can rotate freely in the groove receiving it.

Figure 10:
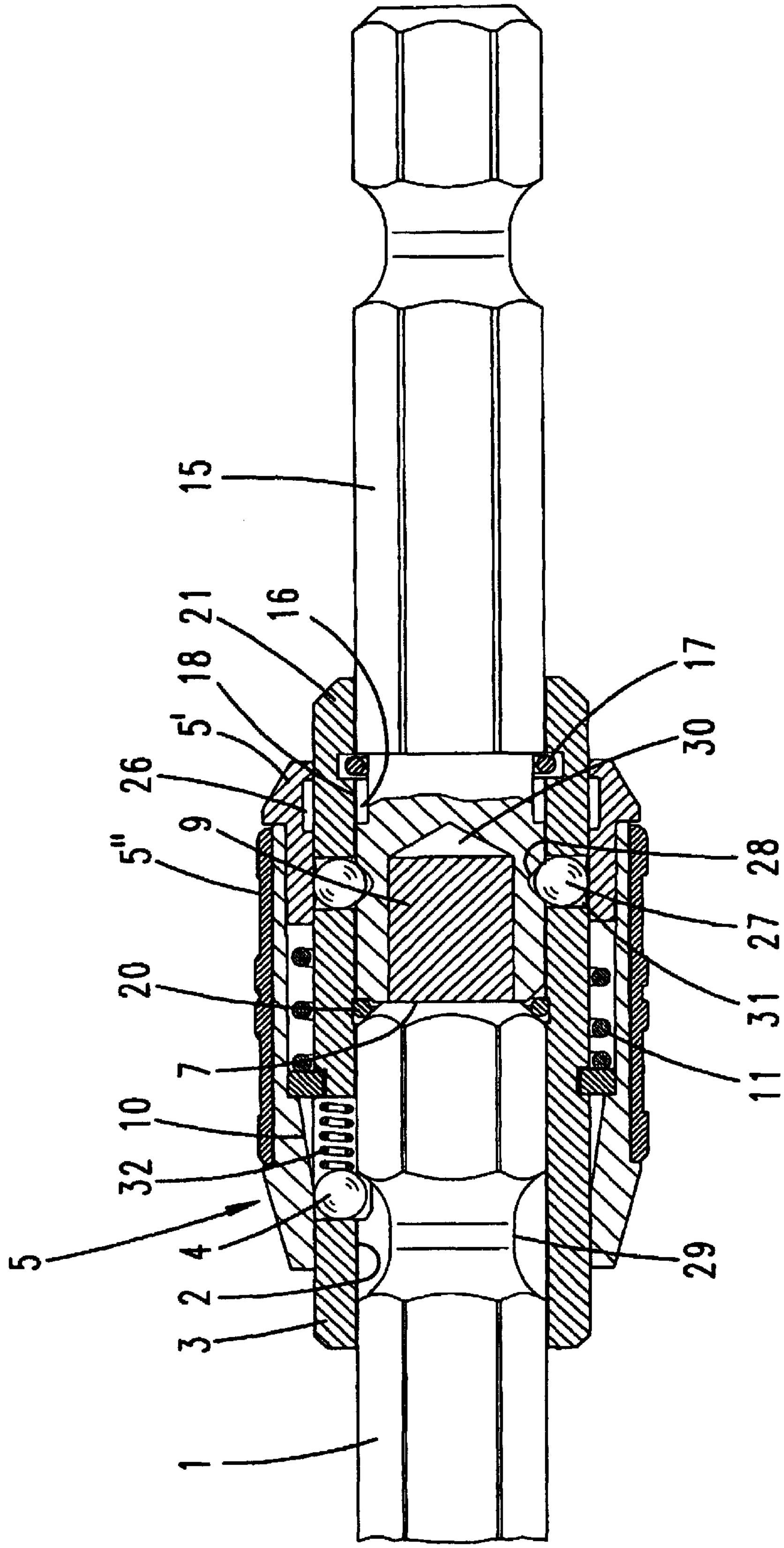
FIG. 10 shows a longitudinal section through the exemplary embodiment illustrated in FIG. 9, with the actuating sleeve in the blocking position.
Figure 11:
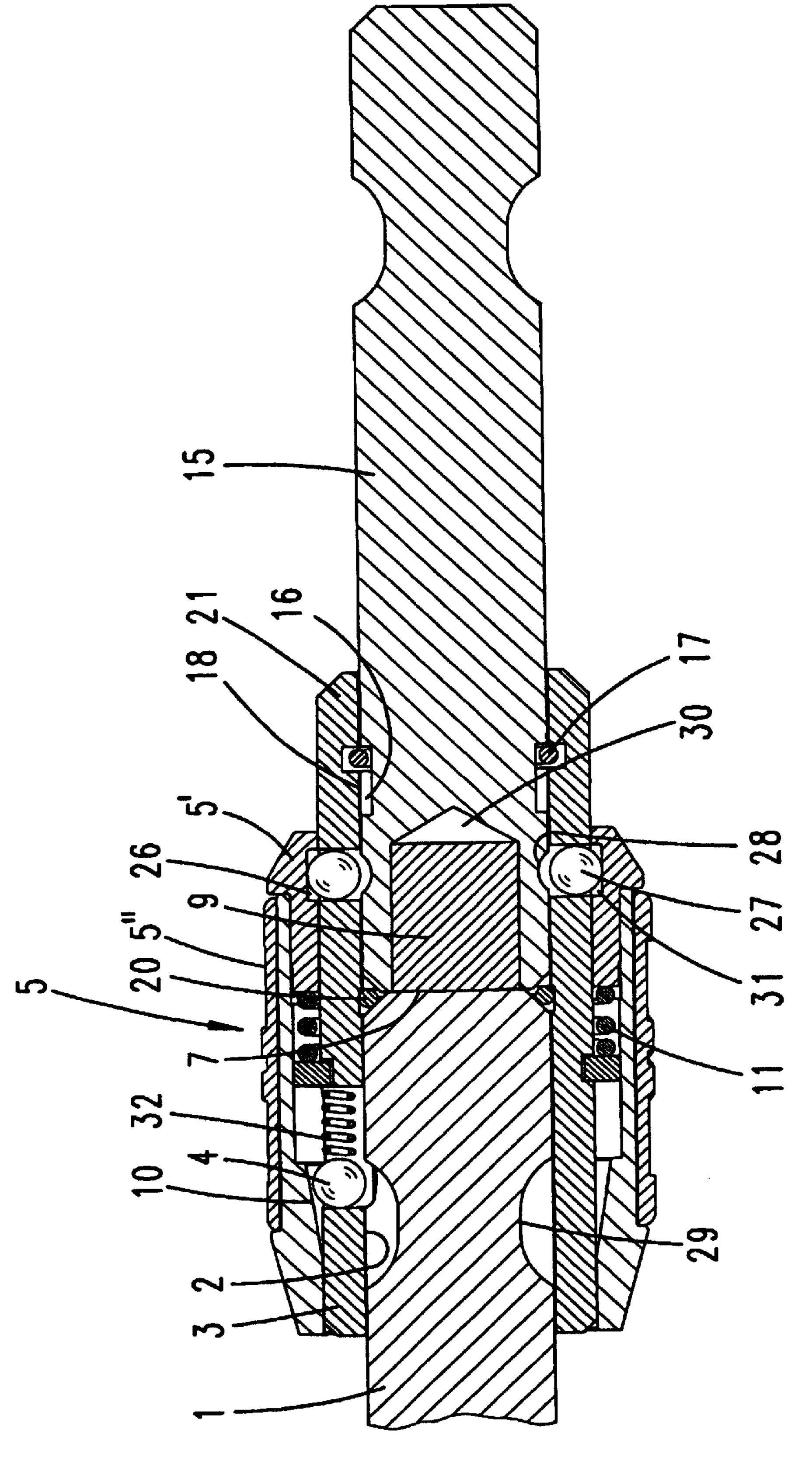
FIG. 11 shows an illustration corresponding to FIG. 10, with the sleeve displaced into the release position.
Figure 12:
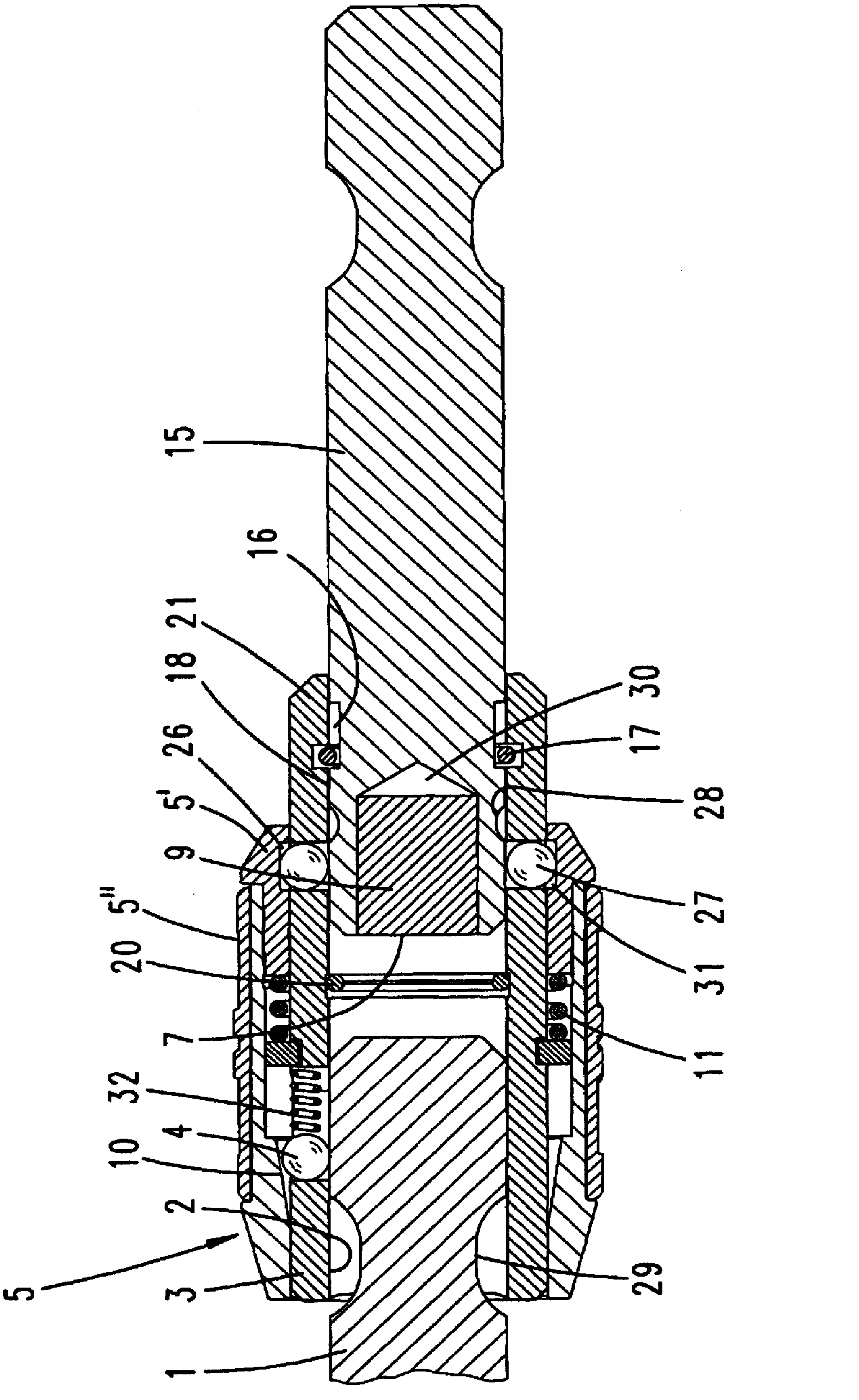
FIG. 12 shows a follow-up illustration to FIG. 11, with an axially displaced clamp-in portion.

The bit illustrated in FIGS. 10 to 12 has a flute 29. In the locking position illustrated in FIG. 10, a holding ball 4 projects into the receiving cavity 2 in regions and bears on a rear flute flank, so that the bit cannot be pulled out of the receiving cavity 2. The end-face bevel of the bit butts against a circlip 20 which is located in a circumferential groove in the receiving cavity 2. The ball 4 is acted on by a clamping flank 10 of the sleeve part 5. The sleeve 5 is held in the locking position illustrated in FIG. 10 by means of a spring 11. In this locking position, the rear end face of the bit 1 bears against an end face 7 of a clamp-in portion 15. The end face 7 is formed by a magnet 9 which is located in a bore 30 in the end of the clamp-in portion 15.

In the rear region, the sleeve portion 21 has two wall cutouts 31 located diametrically opposite one another. The diameter of the substantially circular wall cutout 31 corresponds to slightly more than the diameter of the latching ball 27 located in the wall cutout 31. The diameter of the latching ball 27 is greater than the wall thickness of the sleeve portion 21, so that the latching ball 27 either projects in part into the cavity 18 in the sleeve portion 21 or projects beyond the outer wall of the sleeve portion 21. In the blocking position illustrated in FIG. 10, the latching ball 27 projects into the cavity in the sleeve portion 21. A portion of the clamp-in portion 15 is fitted into this cavity 18 in an axially moveable manner. There, the clamp-in portion 15 has two diametrically opposite moving-aside hollows 28. These hollows may be formed by a circumferential groove.

If, as shown in FIG. 11, a displacement is carried out with respect to the sleeve portion 21 in the removal direction of the bit 1, the spring 11 is stressed. In the displacement position illustrated in FIG. 11, an inner annular groove 26 is located in a position aligned with the wall cutout 31. The two diametrically opposite latching balls 27 can therefore move aside radially outward out of the moving-aside hollow or circumferential groove 28. Whereas in the locking position illustrated in FIG. 10 the displaceability of the clamp-in portion 15 is blocked, this displaceability is possible in the release position illustrated in FIG. 11.

In the operating position illustrated in FIG. 12, the clamp-in portion 15 has been displaced with respect to the sleeve portion 21. In this position, a lateral surface portion of the clamp-in portion 15 provides support for the latching ball 27 on the sleeve inner side, so that the ball cannot move out of the annular cutout 26 in the actuating sleeve 5. In this operating position, the actuating sleeve is held in its release position.

The displacement travel of the clamp-in portion is limited by a circlip 17 which is located in an inner groove in the sleeve portion 21 and is located such that it projects radially inward into an annular cutout 16 in the clamp-in portion 15. The axial width of the cutout 16 defines the axial displacement travel of the clamp-in portion 15.

In the position illustrated in FIG. 12, the holding ball 4 can move aside radially outward, so that the bit can be removed.

A new bit is fitted into the chuck in the reverse order. By way of example, in the operating position illustrated in FIG. 12, the bit can be inserted into its receiving cavity 2 until its end face or the bevel on the end face comes into contact with the circlip 20. The clamp-in portion 15 can be displaced out of the position illustrated in FIG. 12 into the position illustrated in FIGS. 10 or 11 either by the magnetic force of the magnet 9 then becoming active or by mechanical force. In the position illustrated in FIGS. 10 or 11, the latching ball 27 can move aside radially inward into the moving-aside hollow 28 or circumferential groove, so that the actuating sleeve 5 is released to enable it to be displaced into the locking position (FIG. 10). This displacement takes place as a result of the force of the stressed spring 11.

Figure 13:
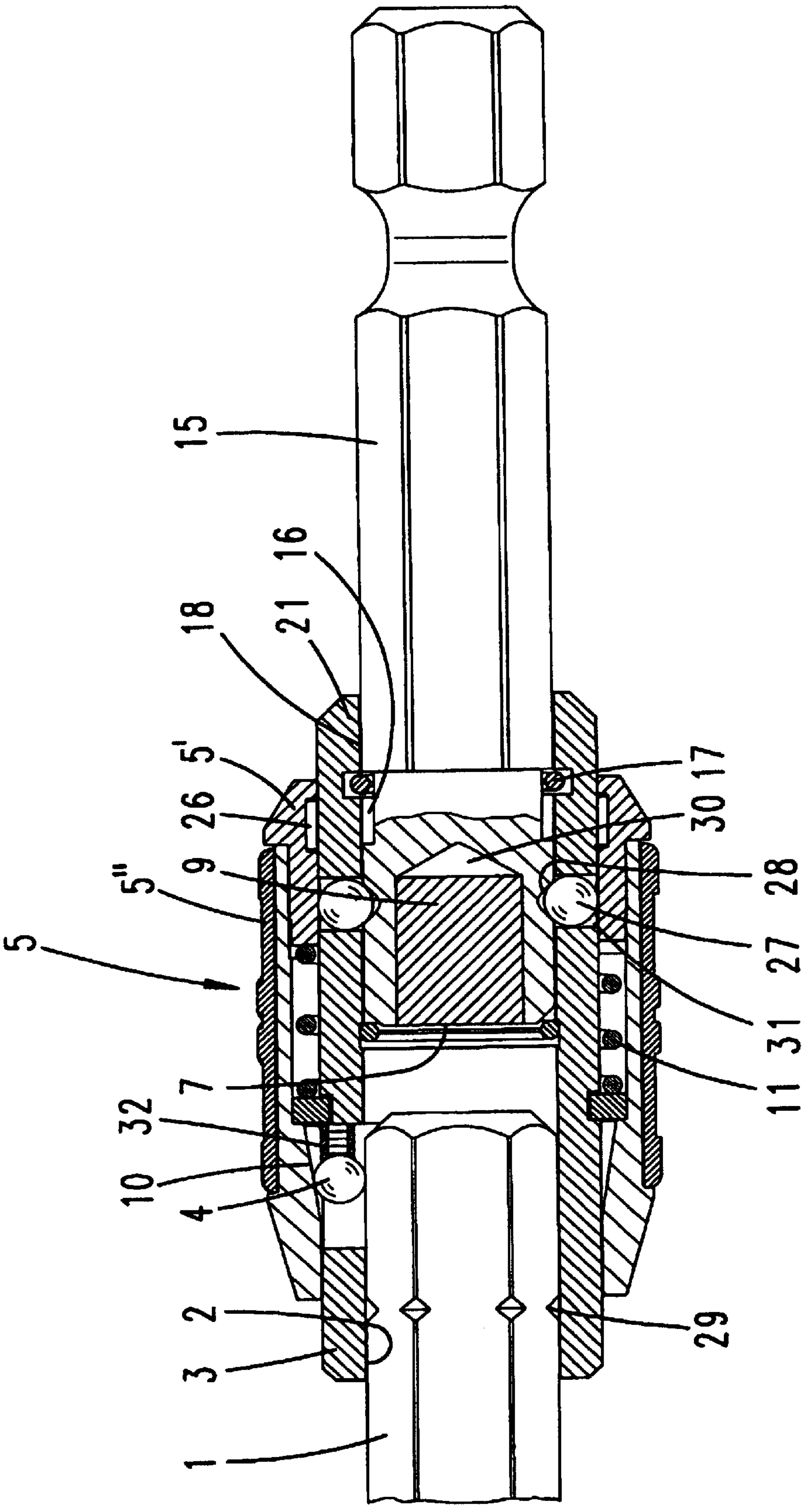
FIG. 13 shows an illustration corresponding to FIG. 10 while a bit is being slid in, with the actuating sleeve in the locking position.
Figure 14:
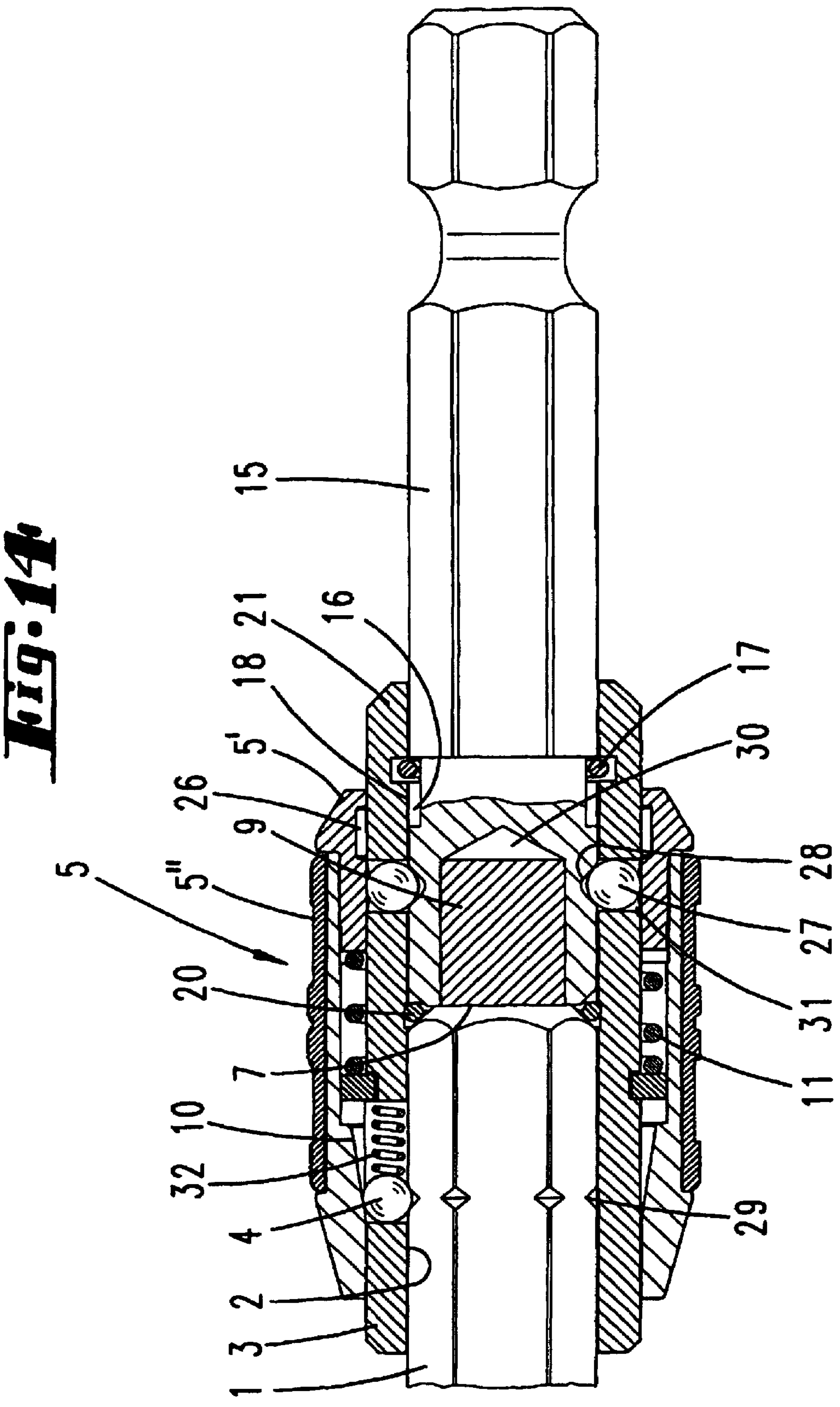

However, it is also possible for a bit to be fitted into the receiving cavity 2 with the actuating sleeve in the locking position (FIG. 13). The holding ball 4 is located in an axially displaceable manner in a window in the sleeve wall. It is displaceable in the insertion direction of the bit counter to the force of a spring 32. When the end face of the bit acts on the holding ball 4, the holding ball 4 can be displaced in the insertion direction of the bit, with simultaneous stressing of the spring 32. It then slides along the clamping flank 10 and can be displaced radially outward until it moves beyond the lateral surface of the bit. The bit can then be fitted fully into the receiving cavity 2 until it reaches the stop position (cf. FIG. 13). In this position, the holding ball 4 prevents the bit from being pulled out even without the holding ball being located in the corner cutout.

A slight displacement of the actuating sleeve 5 in the direction of the release position slightly increases the radial movement travel of the holding ball 4. The holding ball 4 is displaced by the spring 32 into the end region of the window, so that the holding ball 4 can enter into a corner cutout of the bit (cf. FIG. 14). In this position, the clamping flank 10 acts on the holding ball 4 in the radial direction. The latching ball 27 is located in the moving-aside niche 28 in the clamp-in portion 15, so that the clamp-in portion 15 is retained in the axial direction on the sleeve portion 21.

We claim:

1. Chuck for receiving one of various tools (1), which tools can be used by rotation about their axes, the chuck having an insertion portion (3) with a receiving cavity (2) that has a not-round cross-sectional area, the chuck further comprising: a holding element (4) for securing the tool in the receiving cavity (2), the holding element (4) being associated with a wall of the cavity to secure the tool against being pulled out of the receiving cavity (2), which holding dement (4) can be deactivated by a sliding movement of an actuating member, in the form of an actuating sleeve (5) of the chuck, the tool (1) being supported at its rear in the receiving cavity (2), and the chuck having a clamp-in portion (15) which fits into a sleeve portion (21 ) of the chuck, and wherein the actuating member (5) can be locked in a position which holds the holding element (4) deactivated as a result of a sliding movement of the clamp-in portion (15) away from the tool (1) with respect to the sleeve portion (21).

2. Chuck according to claim 1, wherein the actuating member (5) can be locked by means of at least one blocking body (27) which is located in a wall cutout (31) of the chuck and moves into a blocking recess (26) toward the actuating member (5).

3. Chuck according to claim 2, wherein the blocking body (27) is a ball and the blocking recess (26) is an annular groove.

4. Chuck according to claim 2, wherein the blocking body (27), when the clamp-in portion (15) is slid into the sleeve portion (21), is in part located in a moving-aside niche (28) in the clamp-in portion (15) and, when the clamp-in portion (15) is pulled out, is supported at the rear by a lateral surface portion of the clamp-in portion (15).

5. Chuck according to claim 1, wherein the clamp-in portion (15) is axially moveable in a cavity (18) of the sleeve portion (21).

6. Chuck according to claim 1, wherein the holding element (4) is deactivated away from the tool (1) when the clamp-in portion (15) is slidably moved.

7. Chuck according to claim 1, wherein the tool (1) is fixed by a circlip (20) in an axial position in the cavity (18).

8. Chuck according to claim 1, wherein an end face (7) of the clamp-in portion (15) has a distance from the tool (1) when the holding element (4) is deactivated.

9. Chuck according to claim 8, wherein the end face (7) is formed by a magnet (9).

* * * * *